Patented Nov. 4, 1952

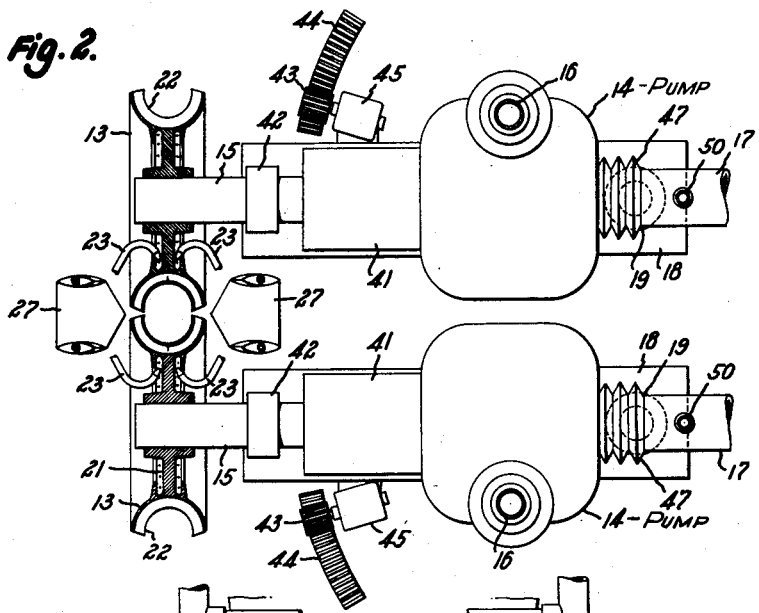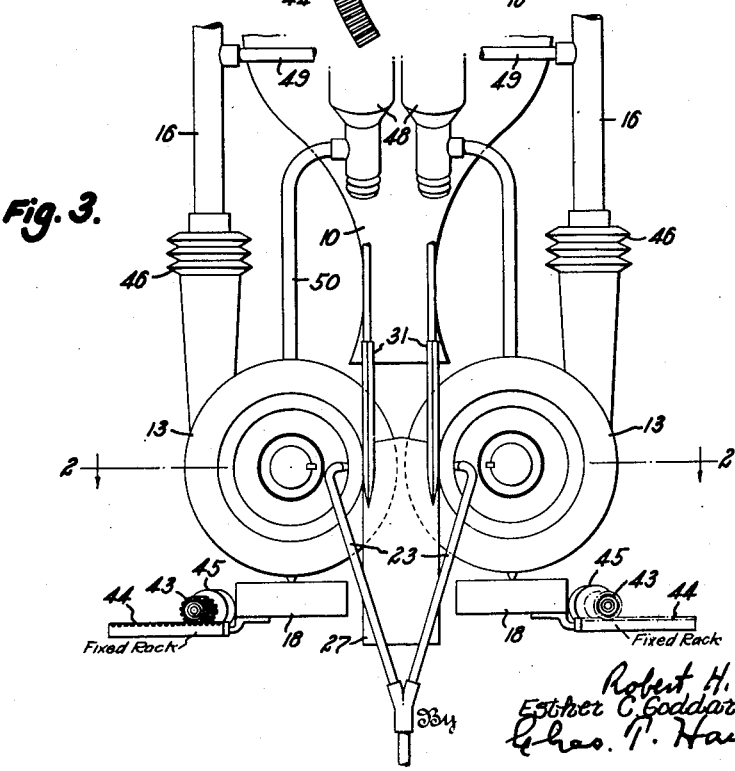

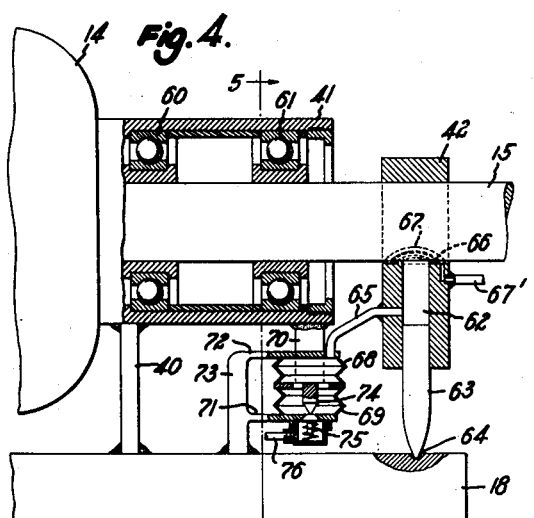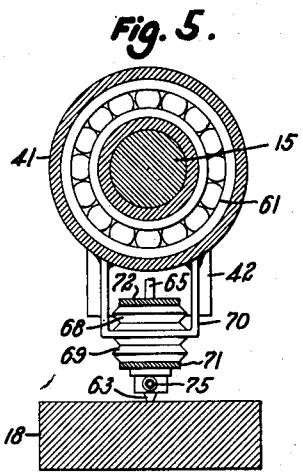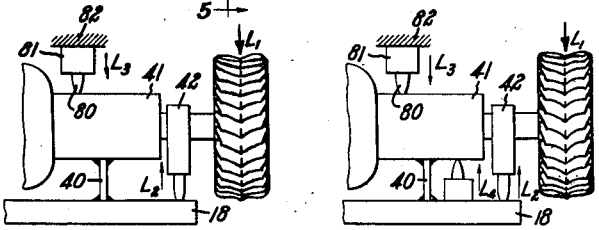

2,616,373

UNITED STATES PATENT OFFICE 2,616,373

PRESSURE REGULATING AND SHAFT POSITIONING MECHANISM FOR TURBINE DRIVEN PUMPS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Original application June 11, 1945, Serial No. 598,755, now Patent No. 2,450,950, dated October 12, 1948. Divided and this application September 28, 1948, Serial No. 51,542

3 Claims. (Cl. 103—87)

This application is a division of the original application Serial No. 598,755 filed June 11, 1945 by Robert H. Goddard now deceased now Patent No. 2,450,950, issued October 12, 1948.

This invention relates to improvements in auxiliary power devices for gas blast propelled craft and particularly to means for utilizing a portion of the rocket propulsion blast for driving pumps for supplying combustion materials to the rocket motor, together with auxiliary means for starting and controlling the operation of the pumps.

In general, the turbine-pump combination herein shown comprises one or more turbines positioned to be impelled in normal operation by the external portion only of a rocket motor blast, together with means for guiding the turbine driving gases into the direction of maximum effective power, means for varying the turbine power by varying the position of the turbine in the blast, means for regulating the pump pressure, and means for counterbalancing the forces on the turbine shaft.

It is the general object of this divisional application to stress such features of this invention as relate to means for supporting the turbine shaft and for counterbalancing the forces thereon.

More specifically, important features of the invention relate to the provision of counterbalancing means controlled by undesired displacement of the turbine shaft from normal running position.

These and other objects and advantages of the invention will be more clearly apparent from the following detailed descriptions of illustrative embodiments of the invention with reference to the accompanying drawings in which:

Fig. 2 is a transverse view in partial section on line 2—2 of Fig. 3 of the turbine-pump assembly of Fig. 1;

Fig. 3 is an elevation from the turbine end of the turbine-pump assembly of Fig. 2;

Fig. 4 is a fragmentary view in partial section showing the thrust compensating construction of the turbine-pump assembly;

Fig. 5 is a transverse sectional view on line 5—5 of Fig. 4; and

Figs. 6 and 7 are diagrammatic representations of modified embodiments of the thrust control construction of the invention.

Figure 1:
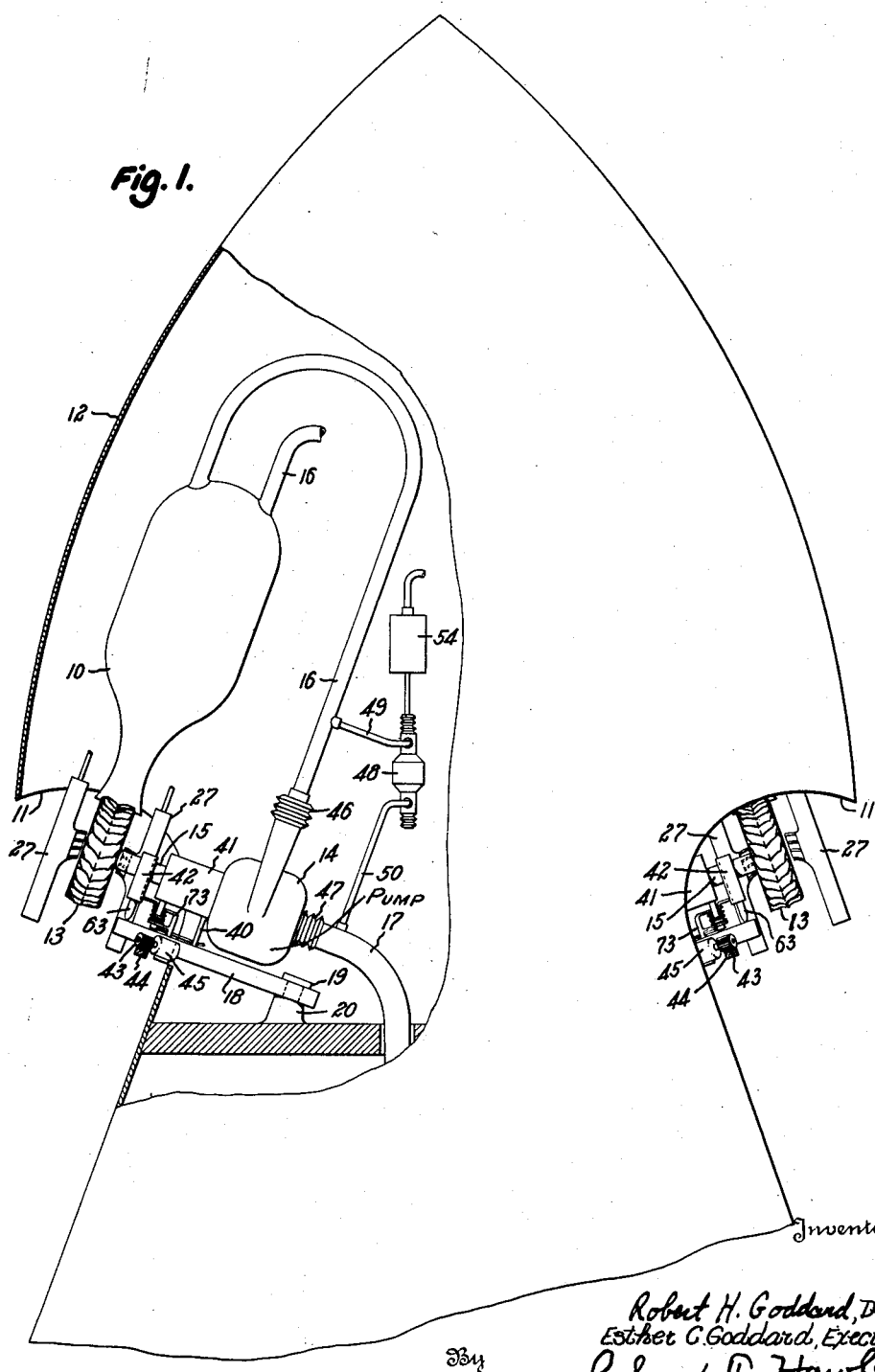
Fig. 1 is a fragmentary front end portion in partial section of a rocket craft including a rocket blast driven turbine-pump construction embodying the principles of the invention.

A typical embodiment of the turbine-pump assembly of the invention is shown generally in Figs. 1 to 3. In Fig. 1 the turbine-pump assembly is shown in association with rocket motors 10 mounted in recesses 11 in the forward or head end of a rocket craft 12. For the sake of clarity only two of a group of four symmetrically positioned rocket motors are shown.

The assembly comprises paired turbines 13, 13 and pumps 14, 14. Each turbine and its associated pump are mounted on a common shaft 15. Typically one pump of each pair in the assembly supplies fuel and the other pump oxidant to the rocket motor 10 through conduits 16. The combustion material flows to the pumps through conduits 17 leading to tanks, not shown, which may conveniently be mounted in the rocket as described in Goddard U. S. Patent No. 2,109,529.

Each turbine-pump combination is mounted upon a base 18 by means of a thin web 40 connecting the base and the bearing housing 41. The base 18 is pivotally supported at 19 upon a suitable pintle 20 extending from the rocket structure. Between the bearing housing and the turbine the shaft passes through a compensating block 42, the purpose of which is more fully described hereinafter.

The preferred form of turbine is shown in Figs. 1 to 3 and comprises a disk 21 having a rather wide rim formed by the hollow turbine blades 22. The blades 22 are shaped to direct that portion of the blast which engages the turbine blades laterally away from the turbine disk to each side thereof. As shown particularly in Fig. 1, the vanes are each curved to engage a substantial portion of half the periphery of the blast. By providing paired turbines engaging opposite sides of the blast, the blast is effected much less than by a single turbine on one side taking the same power. By positioning and shaping the turbine blades to engage only the peripheral portion of the blast, they come in contact with the part of the blast of lowest velocity and of lowest temperature so that it is easier to maintain the blades at a safe operating temperature. This position of the blades also entails the least interference with the high velocity core of the blast.

The gases from the blast leaves the vanes in a more or less transverse direction, and therefore tend to impinge against adjacent surfaces of the rocket craft. Moreover, the residual velocity of the gases that leave the turbine vanes transversely is likely to be large for single stage turbines and is lost for propulsion. These disadvantages may be eliminated and the residual velocity of the exhaust gases utilized for propulsion by the provision of suitable guides or redirectors 27. Each deflector 27 comprises a collector portion within which are straightening vanes for removing eddies.

In order to obtain large variations in thrust, the turbine blades may be swung into and out of the periphery of the rocket blast by rotating the bases 18 about the pivot points at 19. This may be effected by means of pinions 43 engaging fixed racks 44 and actuated by reversible motors 45 fastened to bases 18. To accommodate such movement of the assemblies, flexible bellows 46 and 47 are provided in the outlet pipes 16 and the intake pipes 17, respectively.

Because of the relatively large inertia of the system, however, this method is not suitable for controlling rapid and comparatively small variations in pressure. Rapid pressure control, which is of importance not only in maintaining constant thrust but also in making possible rapid variations in thrust, may be obtained by means of by-pass valves 48 (Fig. 1).

The by-pass valves 48 are connected by tubes 49 to outlet pipes 16 (Fig. 1) and by tubes 50 to intake pipes 17.

Owing to the fact that the blast gases impinge against one side only of the turbines, it is desirable to provide means for neutralizing the resultant radial force on the bearings 60, 61 (Figs. 4 and 5), due to this unbalanced force on the turbine. Moreover, such counterbalancing should be constantly equal to the turbine force, even when the latter varies, as otherwise there will be a large unbalanced radial force on the bearings which is undesirable because of the high speed of the pumps. This counterbalancing is effected by means of the compensator block 42 and associated devices. The block 42, through which shaft 15 passes, has in its bottom portion a cylindrical boring 62 penetrating to the shaft. Plunger 63 which is slidably mounted in boring 62 bears at its pointed lower end in a slight depression 64 in base 18, which serves to prevent sliding of the block 42 along the shaft.

A tube 65 allows air, oil or any suitable pressure fluid to enter the boring 62 between plunger 63 and the shaft. The block 42 fits closely around shaft 15 and a groove 66 containing flexible packing is cut in the block around the inner end of boring 62. Outside of groove 66 is a second groove 67. A drain 67' extends from groove 67 to the outside atmosphere to drain off the pressure fluid which seeps past the packing in groove 66. There will thus be a force exerted on shaft 15, caused by the fluid pressure from tube 65, but the reaction will be against base 18 rather than against block 42. The only unbalanced force on shaft 15 due to block 42 will be that due to the narrow annular area between boring 62 and the packed groove 66 together with a part of the width of the packing. This force will be small, however, because of the smallness of the area involved.

The radial force on the shaft produced by plunger 63 is automatically maintained equal to the radial force on the turbine. This is desirable, as is explained above, for the reason that the unbalanced turbine force is very considerable and the speed of the shaft is high. A reduction of the resultant force in the bearings to a small amount makes possible the use of small light bearings, running with but little loading either end or radial.

Two small bellows 68, 69 fastened together and inter-communicating at their abutting ends, are supported from bearing housing 41 by yoke 70, likewise attached to the bellows at their abutting ends, so that the opposite ends of the bellows are free to move and fluid pressure can pass freely between the two bellows. The outer ends of the bellows are supported on fixed brackets 71, 72 projecting from mounting 73 attached to base 18. Integral with yoke 70 is a valve rod 74, inside the bellows, which can push open a normally spring-closed valve 75.

When the shaft is pushed downwardly by the action of the blast on the turbine, the flexibility of the relatively thin web 40, which supports the pump and turbine unit on the base, permits the valve rod 74 to open valve 75 and thus allows pressure fluid supplied by tube 76, from a tank not shown, to pass into the bellows and through tube 65 into boring 62. The pressure fluid continues to flow into the boring until the bending of the shaft by the turbine force has been overcome. If the turbine force should drop below the compensator force, the excess pressure will bleed off through tube 67'.

Even though the compensator block 42 produces a lateral, or radial, force $L_2$ on the shaft, equal and opposite to that on the turbine $L_1$, (Fig. 6), there will remain a moment of force on the shaft equal to either force times the distance between the compensator block 42 and the turbine, and hence there will still be radial forces on the bearings 60, 61. More effective compensation may be provided by supplying one additional force $L_3$ by means of a plunger 80 sliding in a block 81 similar to 42 but abutting a fixed member 82. In this arrangement, the force $L_2$ must be greater than the force on the turbine $L_1$ by the amount of the added force $L_3$.

An alternative arrangement, indicated in Fig. 7, is somewhat less desirable in that it introduces two additional forces instead of one. The force $L_2$ is, however, no greater in this case than $L_1$. In this arrangement, the two additional forces $L_3$, $L_4$ form a couple equal and opposite to the couple provided by $L_1$, $L_2$. The additional forces $L_3$ and $L_4$ can be made small if the distance between them is considerable.

Having thus described the invention and the advantages thereof, it will be understood that the invention is not to be limited to the details herein disclosed, otherwise than as set forth in the claims, but that what is claimed is:

1. In a blast-driven, turbine-and-pump assembly, the combination with a pump, a turbine and a common shaft mounting said pump and turbine, of fluid-pressure-actuated means to move said shaft transversely, and means responsive to transverse displacement of said shaft from normal running position by said turbine blast, which latter means renders said fluid-pressure-actuated means effective to move said shaft in a direction counter to the direction of said transverse displacement caused by said blast, thereby restoring said shaft to its normal running position.

2. In a blast-driven, turbine-and-pump assembly, the combination with a pump, a turbine and a common shaft mounting said pump and turbine and extending in a direction normal to the path of travel of the propulsion blast, of fluid-pressure-actuated means to move said shaft transversely, and means responsive to transverse displacement of said shaft from normal running position by said turbine blast, which latter means renders said fluid-pressure-actuated means effective to move said shaft in a direction substantially opposite to the travel of said blast and counter to the direction of said transverse displacement caused by said blast, thereby restoring said shaft to its normal running position.

3. In a blast-driven, turbine-and-pump assembly, the combination with a pump, a turbine, a base member extending normal to the path of travel of said blast, a common shaft mounting said pump and turbine and extending parallel to said base member and in a direction normal to the path of travel of the propulsion blast and bearing means carried by said member and rotatably supporting said shaft, of fluid-pressure-actuated means to move said shaft transversely in said bearing means, said shaft bearing being supported from said base member by a web member adapted to flex in a plane normal to the shaft and the base member, and means engaging said shaft and responsive to transverse bending of said shaft from normal running position by said turbine blast, which latter means renders said fluid-pressure-actuated means effective to move said shaft in a direction substantially opposite to the travel of said blast and counter to the direction of said transverse bending displacement caused by said blast, thereby restoring said shaft to its normal running position.

ESTHER C. GOODARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,296,180 | Graemiger | Mar. 4, 1919 |
| 1,411,145 | Whitted | Mar. 28, 1922 |
| 1,547,487 | Allen | July 28, 1925 |
| 1,553,941 | Kasley | Sept. 15, 1925 |
| 1,639,444 | Terry | Aug. 16, 1927 |
| 2,109,529 | Goddard | Mar. 1, 1938 |
| 2,281,631 | Spillmann | May 5, 1942 |
| 2,395,657 | Dinsmore | Feb. 26, 1946 |
| 2,446,523 | Bradbury et al. | Aug. 10, 1948 |
| 2,450,950 | Goddard | Oct. 12, 1948 |
| 2,455,845 | Wells | Dec. 7, 1948 |
| 2,517,038 | Sheffield | Aug. 1, 1950 |

FOREIGN PATENTS

| Number | Country | Date |
|---|---|---|
| 583,728 | Germany | Sept. 8, 1933 |